TWO-WAY TRANSISTOR ELECTRICAL TRANSMISSION SYSTEM

Filed June 1, 1949 4 Sheets-Sheet 1

INVENTOR
R. M. RYDER
BY N. S. Ewing
ATTORNEY

INVENTOR
R. M. RYDER
BY N. S. Ewing
ATTORNEY

Dec. 8, 1953 R. M. RYDER 2,662,122

TWO-WAY TRANSISTOR ELECTRICAL TRANSMISSION SYSTEM

Filed June 1, 1949 4 Sheets-Sheet 3

INVENTOR
R. M. RYDER
BY
N. D. Ewing
ATTORNEY

Dec. 8, 1953 R. M. RYDER 2,662,122
TWO-WAY TRANSISTOR ELECTRICAL TRANSMISSION SYSTEM
Filed June 1, 1949 4 Sheets-Sheet 4

INVENTOR
R. M. RYDER
BY
N. D. Ewing
ATTORNEY

Patented Dec. 8, 1953 2,662,122

UNITED STATES PATENT OFFICE 2,662,122

TWO-WAY TRANSISTOR ELECTRICAL TRANSMISSION SYSTEM

Robert M. Ryder, Summit, N. J., assignor to Bell Telephone Laboratories, Incorporated, New York, N. Y., a corporation of New York Application June 1, 1949, Serial No. 96,500

6 Claims. (Cl. 179—170)

This relates in general to electrical translation devices, and more specifically to electrical amplifier circuits including transistors.

Under usual conditions of operation, when an ordinary three-electrode vacuum tube is connected to operate as a four-pole amplifying circuit with a first and third electrode serving as one pair of terminals, and a second and third electrode serving as a second pair of terminals, power gain is obtained in only one direction of operation, that is, for only three of the six possible orientations of the circuit with respect to the source and the load.

Hence, when such an amplifier is used in applications where two-way transmission is desired, it is necessary to employ complex circuit arrangements which include auxiliary bridging circuits, or separate sets of tubes for each direction of operation.

A broad object of this invention is to provide improved operation in two-way electrical transmission systems, more particularly, by providing a three-electrode electrical translation device adaptable for use as a four-terminal amplifier comprising a single active element which gives substantial power gains in two directions of operation through the said translation device.

In accordance with the disclosure of J. Bardeen and W. H. Brattain in application Serial No. 11,165 filed February 26, 1948, (since abandoned in favor of application Serial No. 33,466 filed June 17, 1948, which issued on October 3, 1950, as Patent 2,524,035), it has been discovered that electrical current is amplified in a circuit including as its active element an amplifying device, known as a "transistor," which comprises a block of germanium, having two electrodes denoted the "emitter" and the "collector" connected in rectifying contact to the treated surface of the block, and a third electrode, denoted the "base," making low resistance contact with the body of the block.

The present invention relates to a bilateral circuit including a four-pole transistor amplifier which operates to give power gain for signals passing through the circuit in both a forward and a reverse direction. In accordance with a particular species of the invention, these gains may be made equal in magnitude.

It is apparent that use of a bilateral amplifying circuit of this type has many advantages, particularly for signal amplification in two-way electrical transmission systems in which the cost of installation and maintenance would be considerably reduced thereby. Moreover, such an expedient would reduce the number of system components, and hence decrease the bulk of the system, a factor which assumes considerable significance in some applications, such as submarine cable systems in which the repeating circuits are preferably included within the armoured sheath surrounding the cable.

The present invention is described with reference to a transistor circuit in grounded collector connection, wherein connections between the base electrode and ground serve as input terminals for signals in a forward direction and as output terminals for signals in a reverse direction, and wherein connections between the emitter electrode and ground serve as input terminals for signals in a reverse direction and output terminals for signals in a forward direction. The circuit parameters are so related that the current gain, that is, the approximate ratio of the current generated in the transistor collector circuit to the current impressed on the emitter circuit, is appreciably greater than unity. In a special case, in which the current gain is equal to 2, the power gains are equal for signals passing through the circuit in both directions.

A particular feature of the amplifier of the present invention is that it operates as a phase inverter for signals introduced at the emitter side of the circuit, but not for those introduced onto the base electrode.

Several modifications of the invention are described wherein bias is provided for the transistor electrodes in an amplifier of the above description under different conditions of operation.

By way of illustrative example a two-way electrical transmission system is disclosed including signal repeating circuits which comprise a transistor bilateral amplifier.

Additional objects, features and advantages of the present invention will be better understood from a study of the detailed description hereinafter and the attached drawings, of which:

Figure 1:
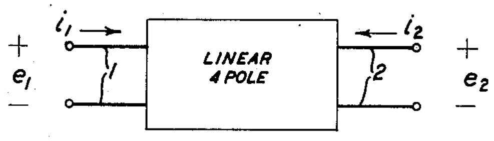
Figs. 1 to 3 are diagrams to familiarize the reader with transistor terminology.

Each of the circuits described in Figs. 4 and 8 to 12 includes as its active element an amplifying device which is known in the art as a "transistor," the construction and operation of which is described in detail in application Serial No. 11,165, supra.

The body of the transistor comprises a block of germanium, or similar material, the crystalline structure of which is believed to be altered by the presence of slight quantities of impurities as described in Bardeen-Brattain supra to provide different conductive types, such as, for example, P-type and N-type. When the major portion of the block comprises material of one type, for example, N-type, the surface of which has been treated in a manner which is believed to produce a thin "barrier" layer of P-type, the block exhibits remarkable amplifying properties. Point contacts, respectively denoted the emitter and the collector, make rectifying contact with the treated surface of the germanium block. A third electrode makes low resistance contact with the body of the block.

In the specification and claims hereinafter, it has been assumed that the body of the transistors disclosed comprises N-type germanium having a treated or barrier layer of P-type. However, it is apparent from a study of Bardeen-Brattain supra, that transistors comprising a block having a body of "P-type" material with a barrier layer of N-type material will be equally suitable for substitution in the circuits described hereinafter. In the latter case, the polarity of the biases on the emitter and collector electrode will be reversed with respect to those indicated in the drawings, and described hereinafter with reference thereto.

As a background for the discussion hereinafter, notations and conventions, as applied to transistor circuits, will be discussed briefly.

Fig. 1 shows a four-terminal device which has two externally accessible meshes. It is convenient to describe such devices as four poles, even though only two of the three possible external meshes are of interest.

Assuming that currents of the form $i_1\epsilon^{pt}$, $i_2\epsilon^{pt}$ are specified arbitrarily in the two external meshes, where $\epsilon^{pt}$ represents a sinusoidal function of time, then voltages $e_1\epsilon^{pt}$, $e_2\epsilon^{pt}$ appearing across the external terminal pairs, are related to the currents by the following set of equations:

$$e_1=\underline{Z}_{11}i_1+\underline{Z}_{12}i_2 \quad (1)$$
$$e_2=\underline{Z}_{21}i_1+\underline{Z}_{22}i_2 \quad (2)$$

where the Z's are complex functions of $p$.

Equations 1 and 2 are valid under the assumptions that the device is linear. The currents $i_1$ and $i_2$ are taken as the independent variables.

Equations 1 and 2 can be symbolized in matrix form as follows:

$$\begin{vmatrix} \underline{Z}_{11}\underline{Z}_{12} \\ \underline{Z}_{21}\underline{Z}_{22} \end{vmatrix} \quad (3)$$

Placing $i_2=0$, and observing from Equations 1 and 2 the dependence of $e_1$ and $e_2$ on $i_1$, it is easy to interpret $\underline{Z}_{11}$ as the driving point or self-impedance of mesh 1 when mesh 2 is open, and $\underline{Z}_{21}$ as the open-circuit transimpedance from mesh 1 to mesh 2 when mesh 2 is open. In a similar manner, when $i_1$ is placed equal to zero, it may be observed that $\underline{Z}_{22}$ is the self-impedance of mesh 2 when mesh 1 is open, and $\underline{Z}_{12}$ the open-circuit transimpedance from mesh 2 to mesh 1.

Figure 2:
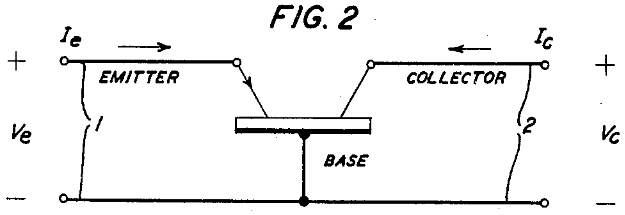

Referring to the conventionalized diagram of the transistor in Fig. 2, which shows an emitter electrode, a collector electrode and a base electrode in contact with a semiconducting body, as described hereinbefore, the terminals 1 to the emitter and the base, and the terminals 2 to the collector and the base may be considered as corresponding to the respective terminals 1 and 2 of the generalized four-pole of Fig. 1.

Assuming that $V_e$ represents the direct emitter potential, $I_e$ the direct emitter current, $V_c$ the direct collector potential, and $I_c$ the direct collector current, it has been found that any two of these may be chosen as independent variables, and the remaining two expressed as functions thereof.

Adopting $I_e$, $I_c$ as independent variables, we have the relation:

$$V_e=V_c(I_e,I_c) \quad (4)$$
$$V_c=V_c(I_e,I_c) \quad (5)$$

Applying small increments $I_e$, $I_c$ to the direct-current values, one computes the first order increments in the voltages as follows:

$$v_e=\frac{\partial V_e}{\partial I_e}i_e+\frac{\partial V_e}{\partial I_c}i_c \quad (6)$$

$$v_c=\frac{\partial V_c}{\partial I_e}i_e+\frac{\partial V_c}{\partial I_c}i_c \quad (7)$$

From the above, placing $I_e=i_e\epsilon^{pt}$, $I_c=i_c\epsilon^{pt}$, $V_e=v_e\epsilon^{pt}$, and $V_c=v_c\epsilon^{pt}$, the equations take the same form as (1) and (2) above, where:

$$\underline{Z}_{11}=\frac{\partial V_e}{\partial I_e} \quad \underline{Z}_{12}=\frac{\partial V_e}{\partial I_c}$$
$$\underline{Z}_{21}=\frac{\partial V_c}{\partial I_e} \quad \underline{Z}_{22}=\frac{\partial V_c}{\partial I_c} \quad (8)$$

It is thus apparent that by the choice of current as an independent variable, the open circuit impedances are arrived at as parameters for describing the linear behavior of the transistor four-pole.

Figure 3:
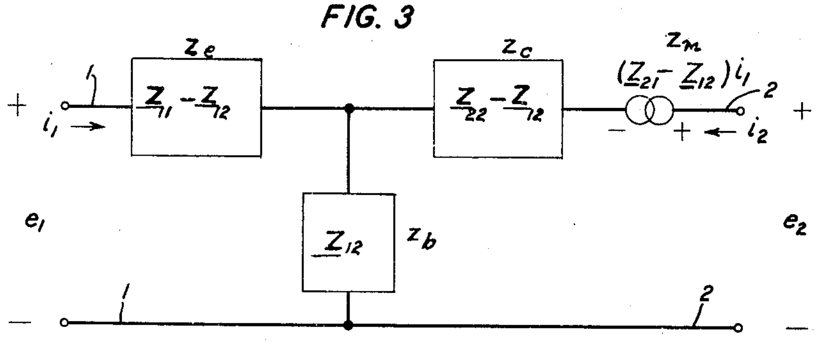

Fig. 3 represents the transistor network of Fig. 2 in the form of an equivalent T network, in which the emitter impedance is represented as $z_e$, the collector impedance as $z_c$, the base impedance as $z_b$, and the net mutual impedance as $z_m$. The active element of the transistor is represented as a voltage generator having polarity as shown, whose relationship to the emitter current is represented as $z_m i_1$, where $i_1$ is the small signal current into the emitter. As indicated in Fig. 3, the impedances of the equivalent transistor circuit can be defined in terms of the four-pole impedances developed above:

$$z_e=\underline{Z}_{11}-\underline{Z}_{12} \quad (9)$$
$$z_c=\underline{Z}_{22}-\underline{Z}_{12} \quad (10)$$
$$z_b=\underline{Z}_{12} \quad (11)$$
$$z_m=\underline{Z}_{21}-\underline{Z}_{12} \quad (12)$$

In the present discussion, the reactive component of the aforesaid impedances will be neglected, and they will be designated as $r_e$, $r_c$, $r_b$, $r_m$.

For the purposes of this specification and the claims hereinafter, a current amplification factor of the transistor will be defined as the ratio $r_m/r_c=\underline{a}$. It will be seen that this value is a close approximation to the transistor current amplification factor $\alpha$, defined as $$\frac{r_m+r_b}{r_c+r_b}$$

providing $r_b$ is made small compared to $r_m$ and $r_c$. The basic transistor terminology thus defined will now be utilized in a brief theoretical discussion of the circuit of the present invention.

Under certain conditions of operation, the transistor may be considered analogous to the ordinary triode vacuum tube, with emitter, base, and collector corresponding to cathode, grid, and plate, respectively. The above conditions obtain when $a$, the current gain of the transistor, approximates unity.

For a vacuum tube triode under the usual biasing conditions, all three of the possible connections (grounded cathode, grounded grid and grounded plate) give power gain in only one direction of transmission. In the other direction there may be some effect, but normally always a power loss of considerable magnitude. Likewise, for the condition $a \leqq 1$, a transistor gives gain in only one direction for all three connections (grounded emitter, base, and collector).

However, when $a$ is appreciably greater than unity, the analogy between transistor and electron tubes becomes less close. For example, consider the circuit indicated in Fig. 4 of the drawings, which is a schematic diagram of the signal paths in a transistor amplifier in accordance with the present invention. This comprises an N-type transistor 1, of the type described hereinabove, having a semiconducting body 2, to which are attached an emitter electrode 3, a collector electrode 4, and a base electrode 5. On one side of the circuit the terminating resistance $R_G$ is connected between the base electrode 5 and a junction or ground point 0. On the other side of the circuit, the terminating resistance $R_L$ is connected between the emitter electrode 3 and the junction or ground point 0. The collector electrode 4 is connected to the junction 0 through a circuit of negligible impedance for signal currents.

Figure 4:
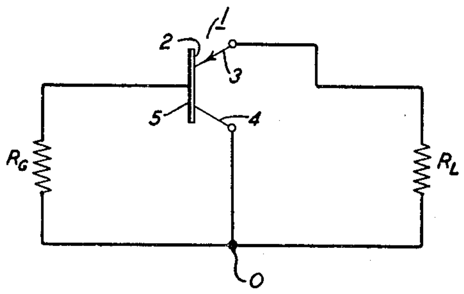
Fig. 4 is a schematic diagram showing of the signal circuit of a transistor amplifier in which the collector is at the low potential or ground point in the circuit.
Figure 5:
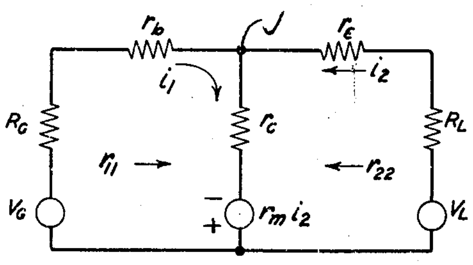
Fig. 5 is an equivalent diagram of the schematic signal circuit of Fig. 4.

Under the assumption that $a>$unity, operation of the circuit of Fig. 4 as shown in the equivalent diagram of Fig. 5 will be briefly analyzed.

Referring to Fig. 5, mesh equations may be set up as follows in accordance with the well-known principle of superposition:

$$v_G=(R_G+r_b+r_c)i_1+(r_c-r_m)i_2 \quad (13)$$
$$v_L=r_ci_1+(r_c+r_e+R_L-r_m)i_2 \quad (14)$$

Note that the symbolism now refers to the meshes of Figs. 4 and 5 which are different from the meshes of Figs. 1, 2, and 3.

From the above equations, the following determinant can be set up:

$$\Delta=(R_G+r_b+r_c)(r_c+r_e+R_L-r_m)-r_c(r_c-r_m) \quad (15)$$

which simplifies to:

$$\Delta=r_c(r_e+R_L)+(R_G+r_b)(r_e+R_L+r_c-r_m) \quad (16)$$

In order for the system to be stable, $\Delta$ must be greater than zero.

Assuming that $a=r_m/r_c$, as defined in the foregoing discussion, $R_\alpha$, which is the real component of $Z_\alpha$, may be defined as follows:

$$R_\alpha=r_b+\left(\frac{1-a}{r_e+R_L}+\frac{1}{r_c}\right)^{-1} \quad (17)$$

and likewise, $$R_\beta=r_e+(1-a)\left(\frac{1}{r_b+R_G}+\frac{1}{r_c}\right)^{-1} \quad (18)$$

Note that the impedances $R_\alpha$, $Z_\alpha$, $R_\beta$ are the actual operating impedances of the circuit, to be distinguished from the open-circuit impedances of the grounded base circuit.

Assume, for the purpose of this specification and the claims hereinafter, that operating gain is defined as the ratio of the power in the load to the power available from the generator, then:

$$\text{Forward Operating Gain}=4R_GR_L|-r_c/\Delta|^2 \quad (19)$$

where forward direction signals will be arbitrarily taken as those input signals impressed between the base and the collector electrodes; then $$\text{Back Operating Gain}=4R_GR_L|(r_m-r_c)/\Delta|^2 \quad (20)$$

From the above it will be understood that in a transistor circuit such as shown in Fig. 4, there may be gain in both a forward and a reverse direction, the ratio of the reverse gain to the forward gain being $(a-1)^2$. Further, if $a=2$, the operating power gains in both directions are of the same magnitude. Inasmuch as resistance can be inserted in the collector lead, thereby effectively increasing the collector impedance $r_c$, $a$ may be regarded as an adjustable parameter.

Transmission from base to emitter is without change in polarity, whereas transmission from emitter to base takes place with a change in polarity. For positive terminating resistance $R_G$ and $R_L$, the impedance of the emitter side of the circuit is usually negative, but the impedance of the base side of the circuit may be either positive or negative.

In any device which is supposed to give gain for both directions of transmission, stability must be a controlling consideration. As indicated from an analysis of the determinant derived in the foregoing paragraphs, there are three main regions of terminating impedance which are of interest. These may be understood by reference to the stability diagram Fig. 6, which represents the condition $\Delta=0$.

The first region may be called "unconditionally stable." If the impedance $R_L$ on the emitter side is large enough, the device is stable for any positive termination on the base side. The unconditionally stable region is given analytically by the inequality $$R_L>r_m-r_c-r_e \quad (21)$$

Even though $R_L$ may be somewhat less than this limit, the device may still be stable if the base side impedance $R_G$ is not too large. This region may be called "conditionally stable." Analytically, the boundary of the stable region is an equilateral hyperbola having the axes $$R_L=r_m-r_c-r_e \quad (22)$$
$$R_G=-r_c-r_b \quad (23)$$

This short discussion of stability assumes that all elements of the transistor are resistive, which is approximately true at low frequencies.

Figure 6:
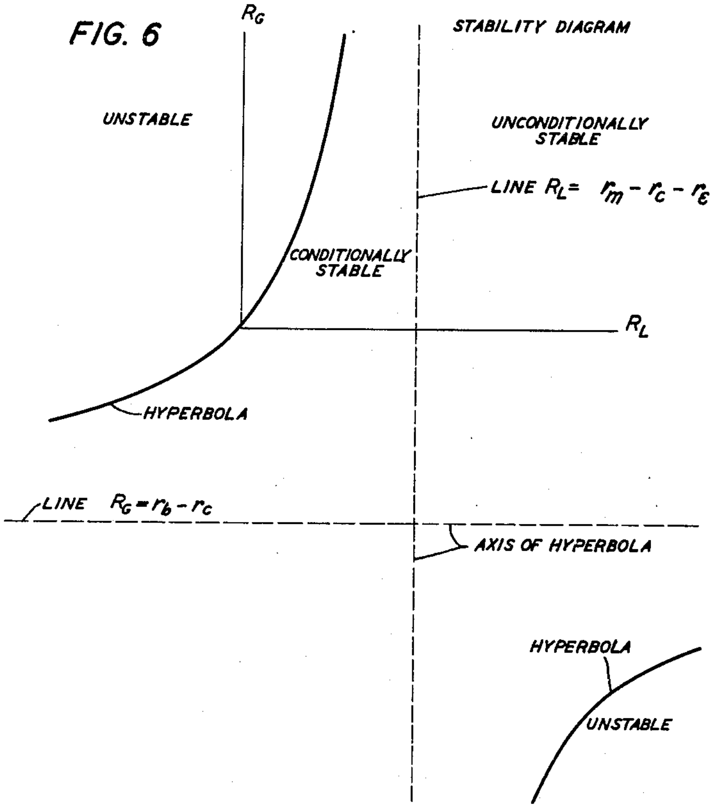
Figs. 6 and 7 are stability diagrams which illustrate the theoretical discussions with reference to Figs. 4 and 5.

It is seen from the foregoing analysis that the parameters $R_L$ and $R_G$ must be so chosen that the point defined by them lies between the two branches of the hyperbola indicated in Fig. 6. This gives, for a particular transistor, a region of stable operating conditions, defined analytically by the condition $\Delta>0$. It is apparent from Fig. 6 and Equations 19, 20 that as the unstable region is approached, more gain is obtained, but at the necessity of controlling the impedances more closely to avoid oscillation.

Figure 7:
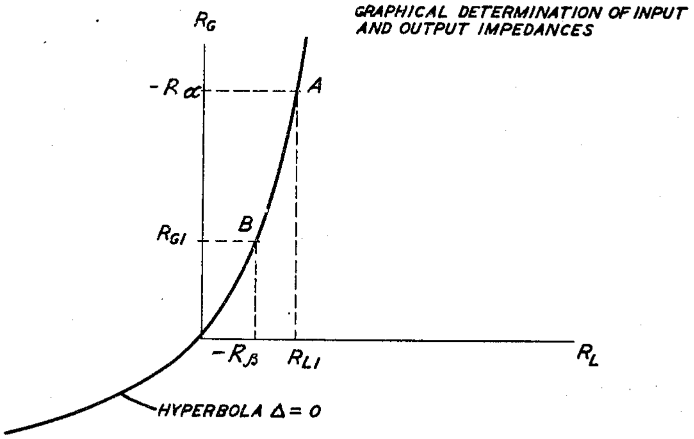

Fig. 7 shows how the operating impedances can be determined graphically for a circuit having signal paths as shown in Fig. 4 by the following procedure:

To find $R_\alpha$, fix $R_L = R_{L1}$;

The corresponding point A on the hyperbola gives the value of $-R_\alpha$.

To find $R_\beta$, fix $R_G = R_{G1}$;

The corresponding point B on the hyperbola gives the value of $-R_\beta$.

Operation of the bilateral signaling circuit, as indicated in Figs. 4 and 5, may be described in physical terms as follows, assuming that a, the current gain, is equal to 2, and that the terminating circuit impedances $R_G$ and $R_L$ are resistive.

Consider first, operation from the emitter side of the circuit. When the emitter is energized, an additional increment of "hole" current or positive charges is injected therein. If a=2, twice as much additional current is generated in the collector lead, thereby causing the fall of the bulk potential of the germanium block near the points, that is, the potential of the junction of $r_b$, $r_e$ and $r_c$, which will be designated as J. This fall in potential of point J carries with it the voltages across $R_L$ and $R_G$, provided $R_G$ is sufficiently large. Accordingly, the resistance of the emitter side of the circuit is negative, and the polarity is reversed in transmission from emitter to base.

Consider second, operation from the base side of the circuit in which the base is energized by injection of an increment of current. Assuming that the resistance $R_L$ is very large, the current injected from the base causes a voltage rise at point J which reduces the emitter current slightly. Accordingly, the voltage across $R_L$ rises. Inasmuch as the impedance of the base side of the circuit is positive, there is no reversal of polarity in transmission.

Assuming, however, that the resistance value of $R_L$ is gradually decreased, the change in emitter current becomes more appreciable, causing a change in the collector current which makes an appreciable further rise in voltage at point J. Some of the base current also flows out through the emitter further increasing the effect. At a critical value of $R_L$, the voltage rise at J becomes infinite for any applied current from $R_G$. Thus, the resistance of the base side of the circuit becomes infinite. As $R_L$ is further decreased, the resistance of the base side of the circuit becomes negative. However, for transmission in the direction from base to emitter the polarity is unchanged, irrespective of the values of impedances, so long as the circuit remains stable.

The arrangement of power leads for the transistor is affected by stability considerations to a much greater extent than is usual for electron tubes. For amplifier applications, the effect of the leads within the frequency band of interest should be made small, as is usual practice. Accordingly, power leads may take the form of either chokes or resistors, having high impedance relative to the impedance presented to the signal, in shunt across the signal source, or may use series blocking condensers having low impedance for signal currents. If series power feeds are used, such as in connection with transformers, low impedance within the band may be preferable.

Assuming stability within the frequency band to have been considered in the design, there is an additional consideration in the design of transistor power leads, namely, that they should not permit instability even outside the amplifier frequency band. For semiquantitative design accuracy, a good guide is the direct-current stability condition, which may be written $$a < 1 + R_e/R_b + R_e/R_c \quad (24)$$

where $R_e$ is the total resistance in the emitter lead including the internal element $r_e$, $R_b$ is the similar total resistance in the base lead including internal and external components, and $R_c$ the similar total resistance in the collector lead.

Where necessary, calculations arrived at this way can be made more rigorous and more precise by the methods conventionally used in feedback amplifier analysis.

With the foregoing considerations in view, and also the limiting conditions for stability outlined in the early part of the specification, particularly as set forth in Equations 22 and 23, several circuits, constituting different modifications of the present invention, have been designed which are suitable for audio amplification. These are indicated in the schematic diagrams of Figs. 8 to 12, which will now be described in detail.

In each of the circuits 8 to 12, the indicated resistance $R_G$ represents the internal resistances of source and load circuits connectible to the base side of the amplifier as indicated to the right of the dotted lines X—X', whereas the indicated resistance $R_L$ represents the internal resistances of the source and load circuits connectable to the emitter side of the circuit as indicated to the left of the line Y—Y'.

By way of illustrative example, the transistors comprised in each of the circuits of Figs. 8 to 12 will be assumed to have the following parameters:

$$r_e = r_b = 200\omega \text{ (negligible)}$$
$$r_c = 20{,}000\omega$$
$$r_m = 40{,}000\omega = \underline{a} r_c$$

Figure 8:
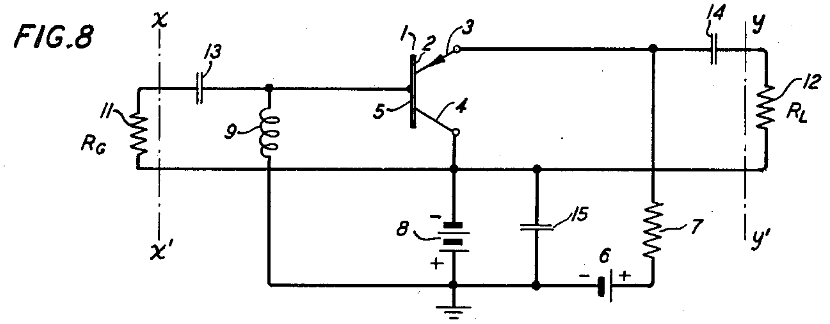
Figs. 8 to 12 show several different types of biasing circuits for the bilateral amplifier described with reference to Fig. 4.

Fig. 8, for example, indicates a circuit the signal paths of which are substantially as described with reference to Figs. 4 and 5 hereinbefore, wherein the biasing leads are brought in using resistance-capacity coupling on the emitter side, and choke-coil coupling on the base side.

Referring to Fig. 8, the transistor 1, constructed in accordance with the foregoing description, comprises a semiconducting block 2, to which are attached an emitter electrode 3, a collector electrode 4, and a base electrode 5. Positive direct-current bias is supplied to the emitter 3 by means of the 100-volt potential source 6 through an 0.1-megohm resistance element 7 connected between its positive terminal and the emitter 3. The negative terminal of the source 6 is connected to the positive terminal of the 40-volt collector direct-current biasing source 8. The collector electrode 4 is maintained at the desired direct-current negative potential with respect to the base 5 and the emitter 3 by connection directly to the negative terminal of the source 8; whereas, the base electrode 5 is connected to the positive terminal of the source 8 through a choke coil 9 having an inductance of 30 henries. Signals are impressed on or derived from the base electrode 5 through a circuit which includes the 20,000-ohm resistance element 11 ($R_G$) in series with the 0.1-microfarad condenser 13 connected between the negative terminal of the potential source 8 and the base electrode 5. At the other side of the circuit, signals are impressed on or derived from the emitter 3 through a circuit which includes the 20,000-ohm resistance element 12 ($R_L$) in series with the 1-microfarad condenser 14 connected between the negative terminal of the potential source 8 and the emitter 3. The 2-microfarad condenser 15 is connected across the terminals of the potential source 8 to serve as a signal by-pass.

Figure 9:
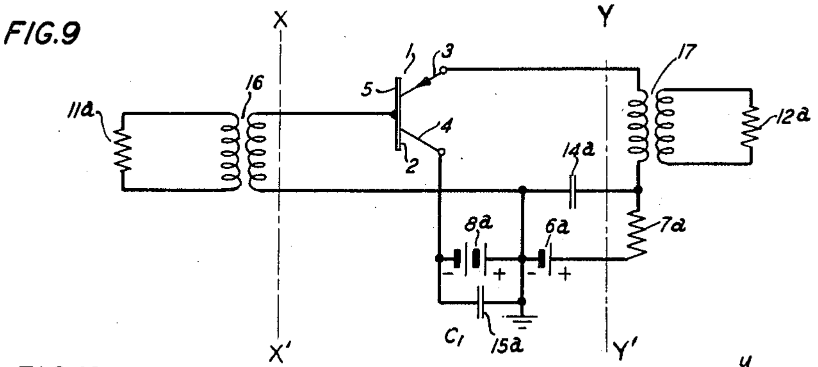

Fig. 9 shows an alternative embodiment of the circuit disclosed in Fig. 8 whereby the energizing leads are brought in through transformers. This circuit has the advantage that by use of suitable turns ratio the transistor may work into transmission lines of any prescribed impedance rather than into more restricted values.

The paths for signal currents in both directions through the transistor 1 will be seen to be substantially as described with reference to Figs. 4 and 5 hereinbefore, the impedances presented by transformers 16 and 17 replacing the resistance elements $R_G$ and $R_L$.

Referring to Fig. 9, the transistor 1, which corresponds to the transistor described in Fig. 8, is coupled for signal transmission in both directions through the transformers 16 and 17. The transformer 16, the secondary coil of which is connected between ground and the base electrode 5, has its primary coil connected across, for example, a signal transmission line having an impedance 11*a* of 75 or 600 ohms. The turns ratio of the transformer 16 is such that the impedance 11*a* is stepped up to present an impedance of 20,000 ohms in the circuit of the base electrode 5. Similarly, on the other side of the circuit, the secondary coil of the transformer 17 is connected with one terminal to ground through the signal by-pass condenser 14*a*, and the other terminal to the emitter 3, the primary coil being connected across the impedance 12*a*, which may be a line impedance as described above, which is stepped up through the transformer 17 to present an impedance of 20,000 ohms in the emitter circuit.

The emitter 3 in the circuit of Fig. 9 derives positive bias current from the 100-volt direct-current source 6*a*, through a circuit which includes the secondary of the transformer 17 connected in series with the 0.1-megohm resistance element 7*a*. The emitter supply circuit is by-passed to ground for signal currents by the 1-microfarad condenser 14*a*. The 40-volt direct-current collector source, across which is connected the 2-microfarad by-pass condenser 15*a*, is connected with the negative terminal to the collector 4 and the positive terminal to ground.

Figure 10:
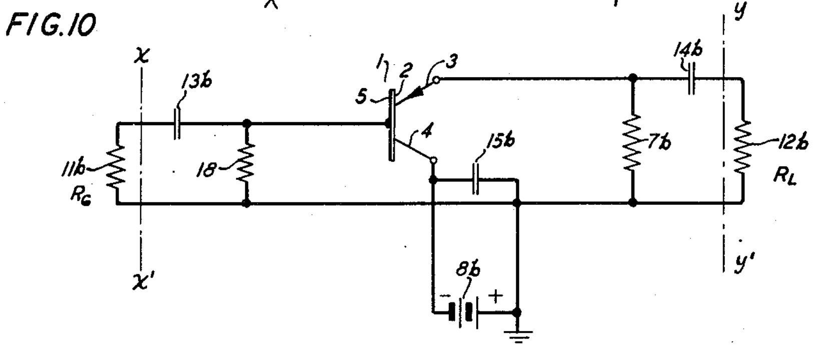
Figure 11:
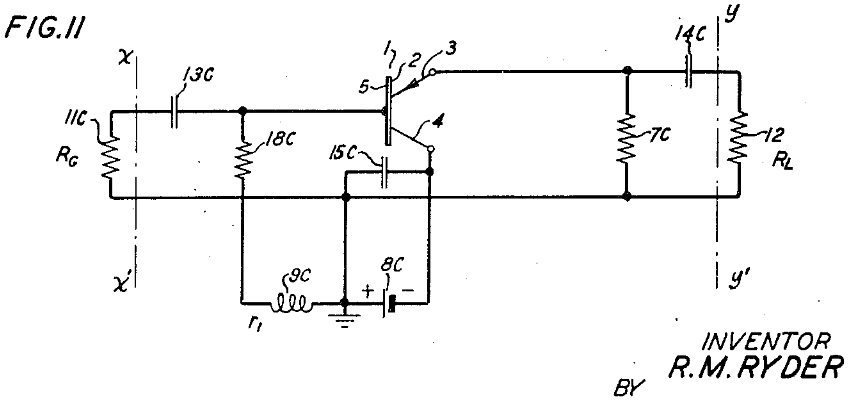
Figure 12:
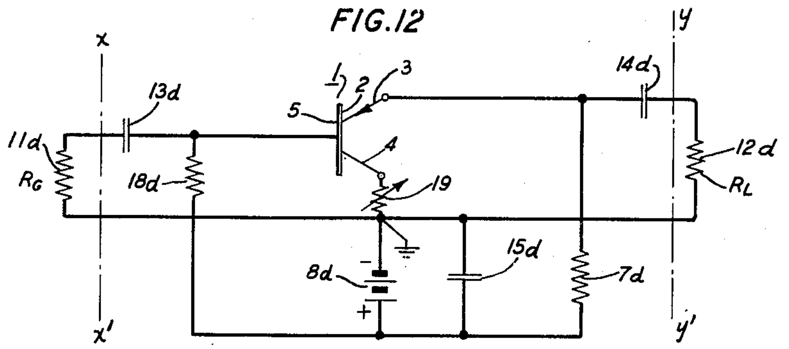

Figs. 10, 11 and 12 show several self-biasing circuit arrangements wherein only one source of power is utilized. The paths for signal currents are substantially as described with reference to Figs. 4 and 5.

In the circuit of Fig. 10, the 20,000-ohm resistors 11*b* and 12*b*, denoted as $R_G$ and $R_L$, are respectively connected between the base electrode 5 and the grounded positive terminal of the bias source 8*b*, and between the emitter electrode 3 and ground. The 0.1-microfarad condensers 13*b* and 14*b* serve to eliminate bias current from the respective base and emitter signal circuits. The single 150-volt direct-current bias source 8*b* is connected with its grounded positive terminal to the emitter electrode 3 through the 0.1-megohm resistance 7*b*, whereby the bias circuit shunts the emitter input and output signal circuit. As in previous circuits, the source 8*b* is by-passed for signal currents by the 2-microfarad condenser 15*b*. The base electrode 5 is maintained at the desired potential with respect to the collector 4 and the emitter 3 through a circuit including the 50,000-ohm resistance 18 shunted across the signal input and output circuit between the base 5 and the grounded positive terminal of the source 8*b*.

Fig. 11 shows a circuit substantially similar to the circuit of Fig. 10 discussed in the foregoing paragraph, with the exception that a 30-henry choke coil 9*c* is interposed in series with the resistance element 18*c* in the bias circuit to the base electrode 5 for the purpose of eliminating signal currents.

The circuit of Fig. 12 incorporates an additional resistor 19 in the collector circuit which can be varied to change the value of a, the current gain, as defined hereinbefore. It is apparent that such a feature could be incorporated in any of the circuits shown in Figs. 8 to 12. In addition, the circuit of Fig. 12 has another practical advantage in that it utilizes a power supply having the negative side grounded, a characteristic design feature of many present-day power circuits. Accordingly, the base signal input and output circuit, which includes the 20,000-ohm resistance 11*d* ($R_G$) in series with the 0.1-microfarad condenser 13*d*, is connected between the base electrode 5 and the grounded negative terminal of the 150-volt biasing potential source 8*d*; and the emitter signal input and output circuit, which includes the 20,000-ohm resistance 12*d* ($R_L$) in series with the 0.1-microfarad condenser 14*d*, is connected between ground and the emitter 3. The variable resistance element 19, which functions to vary the current amplification factor of the circuit, is connected between the collector electrode 4 and the grounded negative terminal of the potential source 8*d*. The resistance 19, which preferably assumes values of the order of $r_m/2-r_c$, should be variable over the range zero to fifty thousand ohms. The positive terminal of the 150-volt bias potential source 8*d* is connected through the 0.1-megohm resistance element 7*d* to furnish positive bias current to the emitter electrode 3, and through the 50,000-ohm resistance element 18*d* to maintain the base 5 at the correct potential with respect to the emitter and collector electrodes. As in the other circuits signal currents are by-passed around the source 8*d* by means of the 2-microfarad condenser 15*d*.

It is apparent that within the scope of the invention there can be many variations in the elements of the circuits of Figs. 8 to 12 and their manner of combination. For example, in place of the linear resistance described, one may use varistors for biasing which are designed to present impedances for bias currents which differ from the impedances presented to signal currents.

Any of the bilateral gain amplifier circuits described with reference to Figs. 8 to 12 are adaptable for use as amplifying elements in two-way electrical systems for the transmission of signals.

Figure 13:
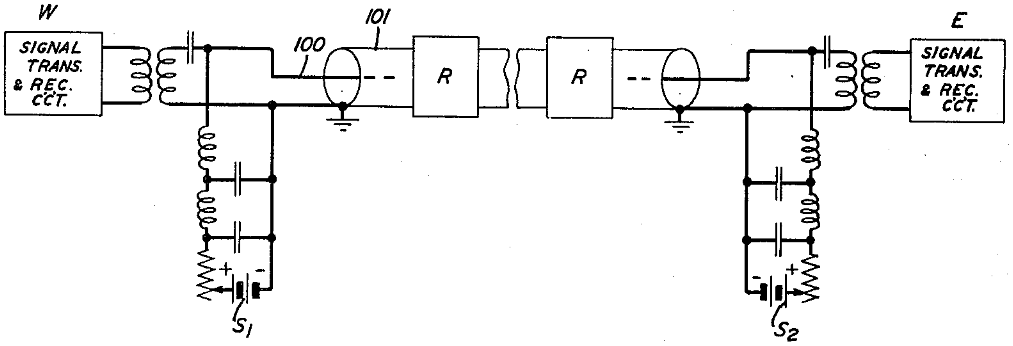
Fig. 13 shows a two-way repeatered electrical transmission system.

Fig. 13, for example, shows a two-way transmission system comprising a sectional coaxial cable having central conductors 100, 100′ and grounded sheaths 101, 101′. A multiplicity of signal repeating circuits R are spaced at intervals along the line. Each of the line terminals is equipped with both signal transmitting and receiving circuits of a type well known in the art.

In accordance with the present invention, the signal repeating circuits R comprise transistor circuits of the type described hereinbefore, in place of the conventional vacuum tube circuits. Assuming that the transistor repeaters are powered by a connection over the line in the manner of vacuum tube repeaters, each of the terminals is respectively equipped with a source $S_1$, $S_2$ of direct-current power. For the purposes of the present illustration, it will be assumed that the respective potentials of the power sources $S_1$ and $S_2$ are such that, taking into account the line impedance, biasing resistors, and the internal resistance of the respective transistors, they provide a current of, say, 0.5 milliampere into the transistor emitters.

Figure 14:
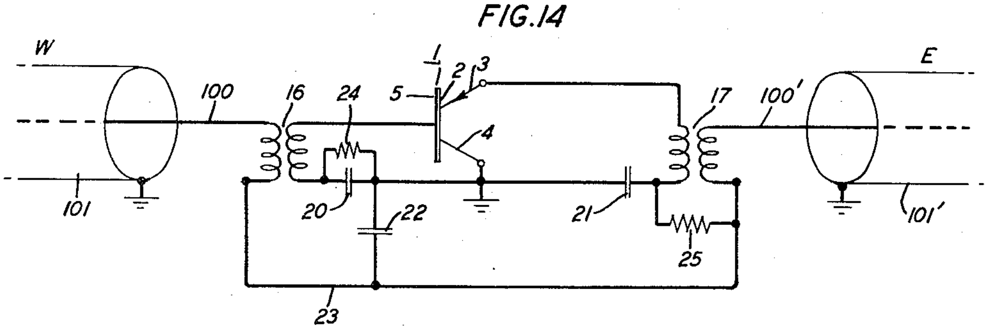
Fig. 14 shows circuit details of a transistor repeater of Fig. 13.

By way of illustration, Fig. 14 shows circuit detail of a typical one of the repeaters R of Fig. 13. It will be seen that the circuit of Fig. 14 is an adaptation of the circuit of Fig. 9, although any other one of the circuits of Figs. 8 to 12 could be so adapted.

Referring in detail to Fig. 14, the circuit of the repeater R comprises a transistor 1, having components, as described with reference to Figs. 8 to 12 hereinbefore, which transistor is coupled in signal repeating relation with the coaxial line 100, 101, 100′, 101′ through the transformers 16 and 17 in the manner described hereinbefore with reference to Fig. 9. The primary coil of the transformer 16 is connected with its high potential terminal to the central conductor 100, on the western side of the repeater, and with its low potential terminal connected to ground through the 100-microfarad condenser 22. The secondary coil is connected with its high potential terminal to the base electrode 5 of the transistor 1, and its low potential terminal to ground through the 0.2-microfarad condenser 20, in parallel with the 50,000-ohm resistor 24. On the eastern side of the circuit, the primary coil of the transformer 17 is connected with its high potential terminal to the central coaxial conductor 100′, and its low potential terminal to ground through the 100-microfarad condenser 22. The secondary coil of the transformer 17 is connected with its high potential terminal to the emitter 3, and its low potential terminal to ground through the 0.1-microfarad condenser 21. A resistor 25, connects the low potential terminals of the primary and secondary coils of transformer 17. Assuming the impedance of the line 100, 101, 100′, 101′ to be 75 ohms, the turns ratio of the transformers 16, 17 would be $$\sqrt{\frac{20,000}{75}}$$

to step up the impedances to the desired 20,000 ohms in the respective base and emitter circuits.

Bias for the electrodes of the transistor 1 is furnished from direct-current potential sources $S_1$ and $S_2$ at the terminals, as indicated in Fig. 13, each of the respective repeaters being arranged to tap power off at a desired point along the line, an auxiliary path 23 for direct current being provided around each of the transistor repeaters, between the low potential terminals of the primary coils of transformers 16 and 17. The emitter 3 in each of the repeaters is connected through an 0.1-megohm feeder resistance 25 to the power line 23. The direct-current potential drop through the 50,000-ohm resistance 24, provides the desired bias between the base and collector electrodes.

As pointed out in the early part of the specification, the transistor 1 may comprise primarily P-type material, instead of N-type, as described, in which case the potentials of the sources $S_1$ and $S_2$ would be the reverse of those shown.

It is apparent that bilateral amplification in accordance with the teachings of the present invention can be carried out in many different types of systems, and using numerous other circuit arrangements than those described herein by way of illustration. For example, in addition to the two-way coaxial cable system disclosed, bilateral amplification in accordance with the present invention is adaptable for use in other types of electrical transmission systems, such as radio carrier, telephone cable, or wire-line carrier transmission systems.

What is claimed is:

1. A bilateral amplifier for transmitting signals with substantially equal power gains in a forward direction and in a reverse direction, said amplifier including a transistor comprising a semiconductor body, an emitter electrode, a collector electrode, and a base electrode cooperatively associated with said body, a first signal input-output circuit including said base electrode and said collector electrode for input signals in said forward direction and output signals in said reverse direction, a second signal input-output circuit including said emitter electrode and said collector electrode for input signals in said reverse direction and output signals in said forward direction, said first and second signal input-output circuits having a common portion including said collector electrode wherein the ratio of the net mutual impedance of said transistor to the internal impedance of said collector electrode is substantially equal to 2.

2. A two-way electrical transmission system including a first terminal station and a second terminal station each including signal transmitting and receiving circuits, a two-wire transmission line connecting the said signal transmitting and receiving circuits at one of said terminal stations in signal transfer relation with those at the other terminal station, a two-way semiconductor amplifier interposed between two portions of said line, said amplifier comprising a semiconducting body, an emitter electrode, a collector electrode, and a base electrode in contact with said body, a first signal input-output circuit connected to one of said line portions and including said base electrode and said collector electrode for input signals in a forward direction of transmission and output signals in the reverse direction, a second signal input-output circuit connected to the other of said line portions and including said emitter electrode and said collector electrode for input signals in said reverse direction and output signals in said forward direction, said first and second signal input-output circuits having a common portion including said collector electrode, wherein the ratio of the mutual impedance of said semiconducting amplifier in a forward direction to the resistance of the common portion including said collector electrode is substantially equal to 2.

3. A two-way electrical transmission system in accordance with claim 2 in which the quantity $r_c(r_e+R_L)+(R_G+r_b)(r_e+R_L+r_c-r_m)$ is greater than zero, where $R_G$ represents the resistance of said first signal input-output circuit external to said body, $R_L$ represents the resistance of said second signal input-output circuit external to said body, and $r_b$, $r_c$ and $r_e$ designate respectively the base resistance, the collector resistance and the emitter resistance of said semiconductor-amplifier.

4. A bilateral amplifier for transmitting signals with substantial power gains in a forward direction and in a reverse direction, said amplifier including a transistor comprising a semiconductor body, an emitter electrode, a collector electrode, and a base electrode cooperatively associated with said body, a first signal input-ouput circuit connected between said emitter electrode and said collector electrode, a second signal input-output circuit connected between said base electrode and collector electrode, said first and said second signal input-output circuit having a common portion including said collector electrode, a first signal source coupled to said first signal input-output circuit for supplying input signals which pass through said transistor in said forward direction, a second signal source coupled to said second signal input-output circuit for supplying input signals which pass through said transistor in a reverse direction, a first signal utilization circuit coupled to said second signal input-output circuit for receiving signals from said first signal source, and a second signal utilization circuit connected to said first signal input-output circuit for receiving signals from said second signal source, wherein the ratio of the net mutual impedance of said transistor in a forward direction to the impedance of said common portion including said collector is substantially equal to 2.

5. A bilateral amplifier for transmitting signals with substantially equal power gains in a forward direction and in a reverse direction, said amplifier including a transistor comprising a semiconductor body, an emitter electrode, a collector electrode, and a base electrode cooperatively associated with said body, a first signal input-output circuit including said base electrode and said collector electrode for input signals in said forward direction and output signals in said reverse direction, a second signal input-output circuit including said emitter electrode and said collector electrode for input signals in said reverse direction and output signals in said forward direction, said first and second signal input-output circuits having a common portion including said collector electrode wherein the ratio of the net mutual impedance of said transistor to the internal impedance of said collector electrode is substantially equal to 2, and wherein said common portion has a negligible impedance for signal current.

6. A bilateral amplifier for transmitting signals with substantially equal power gains in a forward direction and in a reverse direction, said amplifier including a transistor comprising a semiconductor body, an emitter electrode, a collector electrode, and a base electrode cooperatively associated with said body, a first signal input-output circuit including said base electrode and said collector electrode for input signals in said forward direction and output signals in said reverse direction, a second signal input-output circuit including said emitter electrode and said collector electrode for input signals in said reverse direction and output signals in said forward direction, said first and second signal input-output circuits having a common portion including said collector electrode, wherein the ratio of the net mutual impedance of said transistor in a forward direction to the impedance of said common portion including said collector electrode is substantially equal to 2.

ROBERT M. RYDER.

References Cited in the file of this patent

UNITED STATES PATENTS

| Number | Name | Date |
|---|---|---|
| 1,953,496 | Nebel | Apr. 3, 1934 |
| 2,020,297 | Buckley | Nov. 12, 1935 |
| 2,476,323 | Rack | July 19, 1949 |
| 2,486,776 | Barney | Nov. 1, 1949 |
| 2,499,423 | Selinger | Mar. 7, 1950 |
| 2,541,322 | Barney | Feb. 13, 1951 |
| 2,585,078 | Barney | Feb. 12, 1952 |

FOREIGN PATENTS

| Number | Country | Date |
|---|---|---|
| 473,895 | Great Britain | Oct. 21, 1937 |

OTHER REFERENCES

White article in "Audio Engineering," October 1948, pp. 32, 33, 51, 52. Copy in 179–171–MB.